United States Patent [19]

Rubin

[11] 4,379,266

[45] Apr. 5, 1983

[54] PSK DEMODULATOR WITH AUTOMATIC COMPENSATION OF DELAY INDUCED PHASE SHIFTS

[75] Inventor: Michael D. Rubin, Saratoga, Calif.

[73] Assignee: Ford Aerospace & Communications Corporation, Detroit, Mich.

[21] Appl. No.: 136,867

[22] Filed: Apr. 3, 1980

[51] Int. Cl.³ .................... H04L 27/22; H03D 3/00
[52] U.S. Cl. .................... 329/104; 329/110; 375/80; 375/83; 375/119
[58] Field of Search ............... 329/102, 104, 105, 110, 329/126, 136, 137, 107; 375/78, 83–87, 119, 80, 81, 82, 99, 118; 328/155

[56] References Cited

U.S. PATENT DOCUMENTS

| | | | |
|---|---|---|---|
| 3,305,798 | 2/1967 | Rappeport | 328/162 |
| 3,550,021 | 12/1970 | Freeny | 332/48 |
| 3,679,983 | 7/1972 | Theriot | 329/104 |
| 3,787,775 | 1/1974 | Lanning | 329/122 |
| 3,794,921 | 2/1974 | Unkauf | 329/132 |
| 3,818,346 | 6/1974 | Fletcher et al. | 375/84 |
| 3,838,350 | 9/1974 | Ewanus et al. | 329/104 |
| 3,843,931 | 10/1974 | Sarkilahti | 329/104 |
| 3,906,376 | 9/1975 | Bass | 329/104 |
| 3,911,219 | 10/1975 | Mullins | 375/84 |
| 3,919,653 | 11/1975 | Le Mouel | 329/104 |
| 3,944,939 | 3/1976 | Le Mouel | 329/104 |
| 3,971,996 | 7/1976 | Motley et al. | 328/155 |
| 3,990,015 | 11/1976 | Gordy et al. | 329/105 |
| 3,991,377 | 11/1976 | Salazar et al. | 329/105 |
| 3,993,956 | 11/1976 | Gilmore et al. | 329/104 |
| 4,041,533 | 9/1977 | Yamamoto et al. | 328/155 |
| 4,053,932 | 10/1977 | Yamaguti et al. | 328/165 |
| 4,055,814 | 10/1977 | Abraham et al. | 328/155 |
| 4,088,957 | 5/1978 | Perkins | 375/84 |
| 4,091,331 | 5/1978 | Kaser et al. | 329/110 |
| 4,100,499 | 7/1978 | Monrolin | 329/124 |

Primary Examiner—Ernest F. Karlsen
Attorney, Agent, or Firm—Edward J. Radlo; Robert D. Sanborn; Alan Huang

[57] ABSTRACT

This circuit compensates for phase variation introduced by the delay element in a PSK (phase shift keyed) demodulator. The signal to be demodulated is split. One portion is delayed while the other portion is fed to a variable phase shifter and then to a hybrid splitter. The delayed signal and quadrature output of the hybrid splitter are fed to a phase detector which recovers the information. The delayed signal and inphase output of the hybrid splitter are fed to a phase tracking circuit. This phase tracker controls the variable phase shifter in a manner which maximizes the detected signal by compensating for phase variations introduced by the delay element. The fixed component of difference in phase between the delayed signal and the shifted signal is either a multiple of 180° or an odd multiple of 90°, depending upon the coding system employed.

8 Claims, 4 Drawing Figures

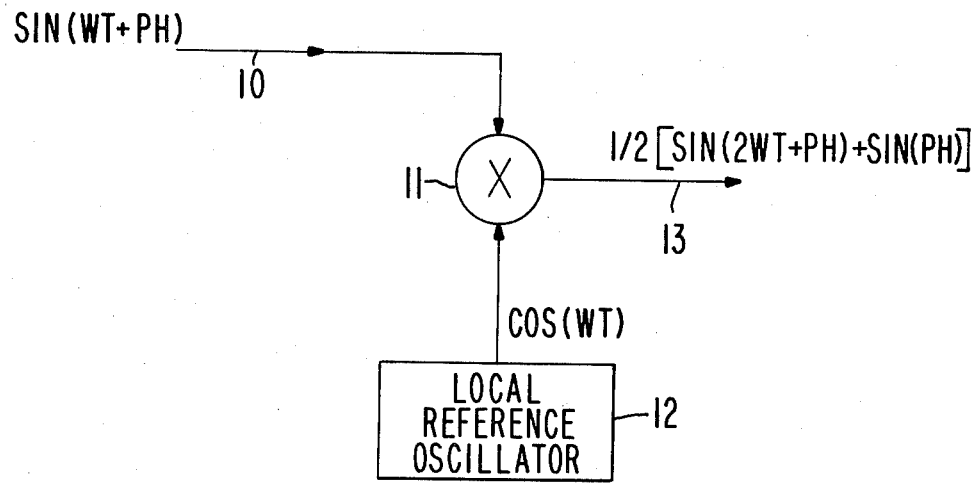
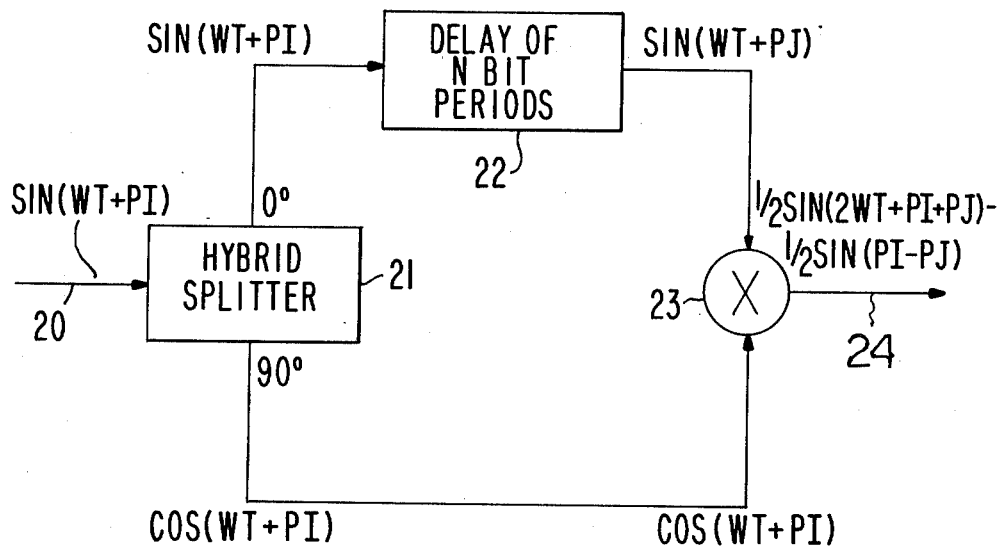

PSK DEMODULATOR WITH AUTOMATIC COMPENSATION OF DELAY INDUCED PHASE SHIFTS

BACKGROUND OF THE INVENTION

1. Field of the Invention

This invention relates to the automatic compensation of phase variations in the delay element of a differentially coherent signal detector used for demodulation of phase shift keyed signals.

2. Description of the Prior Art

Binary phase shift keying (PSK) modulation is widely used in data communications. This modulation technique references the phase associated with a particular bit to the phase associated with a prior bit. As an example, if the phase of the Nth bit is X then the phase of the next bit will be X+90° if this next bit is a 1 and X−90° if this next bit is a 0, or vice versa. Or, if X is the phase of the Nth bit then the phase of the next bit will be X if this next bit is a 1, and X+180° if this next bit is a 0, or vice versa.

There are two basic approaches towards demodulating these signals. One method involves coherent signal detection using a local reference carrier as shown in FIG. 1. The received signal at 10, sin (WT+PH), is mixed by mixer 11 with a signal cos (WT) from a local reference oscillator 12, where W is the frequency, T is the time and PH is the phase angle. The output of mixer 11 at 13 is ½ sin (PH)+½ sin (2WT+PH). The phase of the received signal can be extracted from the baseband portion of this signal, ½ sin (PH). This technique involves comparing the phase of the received signal with the phase of a local reference carrier.

The main difficulties with this approach involve synchronizing the phase and matching the frequency of the local carrier with that of the original transmitter carrier.

A second approach for demodulating these signals involves a differentially coherent signal detection scheme as shown in FIG. 2. The received signal at 20, sin (WT+PI), where PI represents the phase angle, is split by hybrid splitter 21. The inphase portion is applied to delay element 22. The output of the delay element, the delayed signal sin (WT+PJ), where PJ represents the phase of the delayed signal, is connected to the input of mixer 23. The quadrature portion of the signal from hybrid splitter 21, cos (WT+PI), is fed to mixer 23. The output of mixer 23 is ½ sin (2WT+PI+PJ)-½ sin (PI-PJ). The relative phase shift between the received bit and the prior bit can be extracted from the baseband portion of the signal, ½ sin (PI-PJ), emerging at 24 from mixer 23. This technique involves comparing the phase of the received bit with the phase of a prior bit. No local reference oscillator is needed; however, the phase of the prior bit must be saved for comparison. This can be accomplished by a delay element.

For optimal detection, the signals associated with the current and prior bit must simultaneously arrive at mixer 23. To accomplish this, the time delay introduced by the delay element 22 must be stable. Unfortunately, this stability is affected by temperature, age, and fluctuations in the frequency of the signal. The purpose of this invention is to insure maximum signal at the phase detector by automatically compensating for phase shifts introduced by the delay element.

A prior art search was conducted and the following patents were uncovered: U.S. Pat. Nos. 4,055,814; 3,919,653; 3,911,219; 3,906,376; 4,100,499; 3,787,775; 3,993,956; and 3,550,021 all require a voltage controlled oscillator. My invention uses differential coherent detection and does not require such a local reference oscillator.

U.S. Pat. Nos. 3,990,015; 3,991,377; 3,944,939; 3,838,350; and 3,794,921 all use delays for demodulation, but none of these systems provide a means to compensate for phase shift variations in the delay as does my invention.

U.S. Pat. Nos. 4,088,957; 3,818,346; and 3,843,931 do not use delays for demodulation nor do they have a phase shift correction mechanism as does my invention.

U.S. Pat. Nos. 3,305,798 and 4,053,932 do not involve coherent signal detection and are thus not applicable.

U.S. Pat. No. 4,091,331 utilizes a phase error predictor which requires the recovery of the clock signal. My invention operates directly with the signals and requires neither clock recovery nor bit synchronization.

U.S. Pat. No. 4,041,533 compensates for a variable delay in an analog video baseband signal; it can not be used to detect phase shift keyed signals or delay such signals. Unlike the present invention, the circuit requires introduction of reference pulses.

SUMMARY OF THE INVENTION

A binary phase shift keyed (PSK) signal (A) is split. One portion (B) is delayed by n bit periods. The other portion (C) is fed to a variable phase shifter. The delayed and the phase shifted portions are each split.

One portion of the delayed signal (B) is mixed with a portion of the phase shifted signal (C) by a mixer 55 which serves as a phase detector. The result is low pass filtered to form a signal dependent on the relative phase difference between the delayed signal (B) and the phase shifted portion (C), thus recovering the phase shift keyed information.

The other portion of the delayed signal (B) and the phase shifted signal (C) are fed to a phase tracking circuit. The delayed signal (B) is split and fed to two mixers 62 and 61. The phase shifted signal (C) is fed to a 90° hybrid to produce an inphase and a quadrature signal. The inphase portion is fed to mixer 62 while the quadrature signal is fed to mixer 61. The results from the mixers 62 and 61 are low passed and fed to a multiplier to produce a signal dependent on the phase difference between the delayed (B) and phase shifted (C) signals but independent of the keying induced phase shift. The signal is conditioned and used to control the variable phase shifter as part of a negative feedback loop which compensates for any phase shifts introduced by the delay element because of age, temperature, frequency shifts or other factors. This maximizes the signal from the phase detector.

In the case of quadraphase shift keyed signals, the phase detector, mixer 55, is replaced with a quadrature detector, and inputs of the phase tracking circuit are first fed to frequency doublers. The frequency doublers effectively reduce the quadraphase shift keyed signal to a binary phase shift keyed signal which the phase tracking circuit can operate on.

The phase shift keyed signals of this invention can have any a.c. frequency.

BRIEF DESCRIPTION OF THE DRAWINGS

These and other more detailed and specific objects and features of the present invention are more fully discussed in the following specification, reference being had to the accompanying drawings, in which:

FIG. 1 is a block diagram of a prior art coherent signal detection scheme for PSK which uses a local reference oscillator to extract the phase of the received signal;

FIG. 2 is a block diagram of a prior art differentially coherent signal detection scheme for PSK which extracts the relative phase between the current and a delayed signal;

DESCRIPTION OF THE PREFERRED EMBODIMENTS

Figure 3:
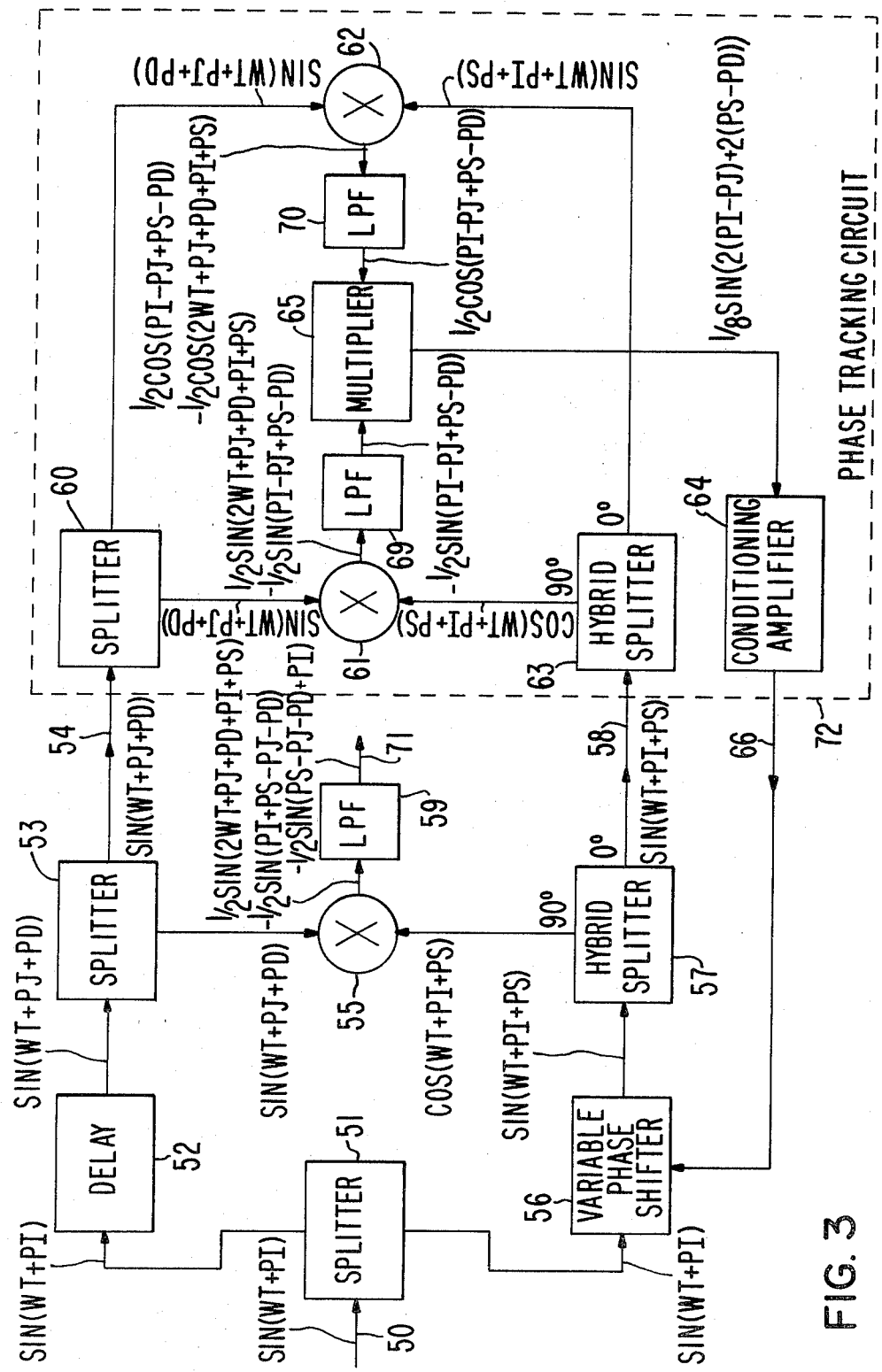
FIG. 3 is a block diagram of a differentially coherent detector of the present invention with a variable phase shifter and phase tracking circuit to compensate for phase shifts introduced by the delay element.

FIG. 3 shows a phase tracking circuit for a differentially coherent signal detector which maximizes the detected signal by compensating for phase shift variations introduced by the delay element 52. Splitters 51 and 53, delay 52, variable phase shifter 56, 90° hybrid splitter 57, mixer 55, and low pass filter 59 form a differentially coherent signal detector. A binary phase shift keyed signal of the form sin (WT+PI) is introduced to the differentially coherent detector at 50. W represents the frequency, T the time, and PI the phase of the current bit. This signal is split by splitter 51.

One portion is fed to a delay element 52 which has a delay equivalent to n bit periods. The output of the delay element 52 can be represented as sin (WT+PJ+PD). PJ represents the phase associated with the previous bit and PD represents the phase error introduced by delay element 52. This signal is split by splitter 53. One portion is fed to phase tracking circuit 72 via connection 54. The other portion of the signal is fed to a mixer 55.

The other portion of the signal from splitter 51 is fed to a variable phase shifter 56. The output of phase shifter 56 is represented by sin (WT+PI+PS) where PS is the phase shift introduced by the variable phase shifter 56. This signal is split by a 90° hybrid 57. The inphase portion of the signal, sin (WT+PI+PS), is fed to phase tracking circuit 72 via connection 58. The quadrature portion of the signal, cos (WT+PI+PS), is fed to mixer 55 which functions as a phase detector. The output of mixer 55 is cos (WT+PI+PS) · sin (WT+PJ+PD). This is equal to ½ sin (2WT+PI+PS+PJ+PD)−½ sin (PI−PJ+PS−PD).

This signal is fed to a low pass filter 59. The resulting signal is −½ sin (PI−PJ+PS−PD). To maximize the coherent detection of this signal, the phase variation introduced by phase shifter 56, PS, should equal the phase error of delay 52, PD, or differ from it by 180°. This adjustment of the variable phase shifter 56 is the responsibility of phase tracking circuit 72 to be described. When the phase shifter 56 is adjusted correctly, the output of low pass filter 59 will be −½ sin (PI−PJ). Since the phase PI is either 90° or −90° relative to that of PJ, the output of filter 59 is either −½ or ½. These are interpreted as either "1" and "0", respectively, or "0" and "1", respectively, depending on the coding system employed.

Splitter 60, mixers 61 and 62, 90° hybrid shifter 63, conditioning amplifier 64, low pass filters 69 and 70, and multiplier 65 form phase tracking circuit 72. The delayed signal, sin (WT+PJ+PD), is fed from splitter 53 via connection 54 to splitter 60. One portion of this signal from splitter 60 is fed to mixer 61 while the other portion is fed to mixer 62. The inphase portion of the phase shifted signal, sin (WT+PI+PS), is fed from hybrid splitter 57 via connection 58 to hybrid splitter 63.

The inphase portion of the signal sin (WT+PI+PS) from hybrid splitter 63 is fed to mixer 62 while the quadrature portion, cos (WT+PI+PS), is fed to mixer 61. The output of mixer 61 is ½ sin (2WT+PJ+PD+PI+PS)−½ sin (PI+PJ+PS−PD). This is low passed by filter 69 to produce −½ sin (PI−PJ+PS−PD). This is fed to multiplier 65. The output of mixer 62 is ½ cos (PI−PJ+PS−PD)−½ cos (2WT+PJ+PI+PS+PD). This is low passed by filter 70 to produce −½ cos (PI−PJ+PS−PD). This is fed to multiplier 65. The output of multiplier 65 is ⅛ sin (2(PI−PJ)+2(PS−PD)).

For the embodiment where the difference between PJ and PI is either 90° or −90°, the 2(PI−PJ) term drops out, which leaves −⅛ sin 2(PS−PD), which is independent of the phase shift keyed modulation but dependent on the difference between the delay induced phase variation on connection 54 and the shifter induced phase variation on connection 58. This signal is fed to a conditioning amplifier 64 which scales the signal. The output of this amplifier is fed by connection 66 to variable phase shifter 56. This forms a phase tracking loop which maximizes the detected signal by providing a negative feedback which adjusts phase shifter 56 to compensate for any phase variations introduced by delay 52. The time constant of the loop is governed by the characteristics of amplifier 64.

Assuming that the variable phase shifter 56 produces a phase shift proportional to the signal on connection 66, the loop operates in the following manner.

If the variable shifter induced phase variation of the signal on connection 58, PS, is equal to the delay induced phase variation of the signal on connection 54, PD, then the output of multiplier 65 will by −⅛ sin (2×0) which is equal to 0. The output of amplifier 64 will also be 0 and the phase will not be changed by shifter 56.

If PS is larger than PD by E, where E is a slight angular deviation, then −⅛ sin (2E) will be fed from multiplier 65 to amplifier 64. Amplifier 64 scales this to produce a signal proportional to −sin (2E) which causes shifter 56 to decrease PS. This continues until PS is equal to PD.

If PS is slightly smaller than PD by E then +⅛ sin (2E) will be fed from multiplier 65 to amplifier 64. Amplifier 64 scales this to produce a signal proportional to +sin (2E) which causes shifter 56 to increase PS. This continues until PS is equal to PD.

The loop is also stable if the phase difference between PS and PD is ±180°. For the case where PS−PD=180°, the output of multiplier 65 is −⅛ sin (2×180°)=0. The output of amplifier 64 is 0 and the phase of shifter 56 is not changed. If PS is larger than PD by 180+E° then the output of multiplier 65 is −⅛ sin (360+2E) which is equal to −⅛ sin (2E). The output of amplifier 64 is proportional to −sin (2E). Shifter 56 then decreases PS. This continues until PS−PD equals 180°.

If PS is larger than PD by 180−E° then the output of multiplier 65 is −⅛ sin (360−2E) which is equal to +⅛ sin (2E). The output of amplifier 64 is proportional to sin (2E) which causes shifter 56 to increase PS. This continues until PS−PD equals 180°.

The loop is unstable if PS−PD is equal to 90°. The loop will force PS−PD=90+E° to PS−PD=180° while PS−PD=90−E° will be forced to PS−PD=0°. Similarly, PS−PD=270° is an unstable condition. The loop will force PS−PD=270+E° to PS−PD=360°=0 while PS−PD=270−E° will be forced to PS−PD=180°.

The phase tracking circuit 72 in conjunction with variable phase shifter 56 forms a servo loop which keeps the phase difference between the shifted and delayed portions of the signal in the coherent detector, PS−PD, equal to either 0° or 180°. This loop automatically compensates for any phase shifts, PD, introduced by delay 52 because of temperature, age, or other factors.

This maximizes the detected signal emerging at 71. This maximized signal will either be $-\frac{1}{2}$ sin (PI−PJ) or $-\frac{1}{2}$ sin (PI−PJ+180) (which equals $\frac{1}{2}$ sin (PI−PJ)), depending on whether PS−PD=0° or 180°. This leads to a "1" or "0" ambiguity which can be easily resolved by the coding.

For the embodiment where the signaling format places the (N+1)st bit in phase or 180° out of phase with the Nth bit, the output of multiplier 65 is now $\frac{1}{8}$ sin 2(PS−PD), which has the opposite sign from the previous case. Under these conditions the stable points for the loop occur when PS−PD= ±π/2, ±3π/2 and the unstable points occur when PS−PD=0, ±π. Thus the phase correction loop automatically introduces a 90° phase shift between the delayed and undelayed signals; maximum output is still obtained from mixer 55.

Figure 4:
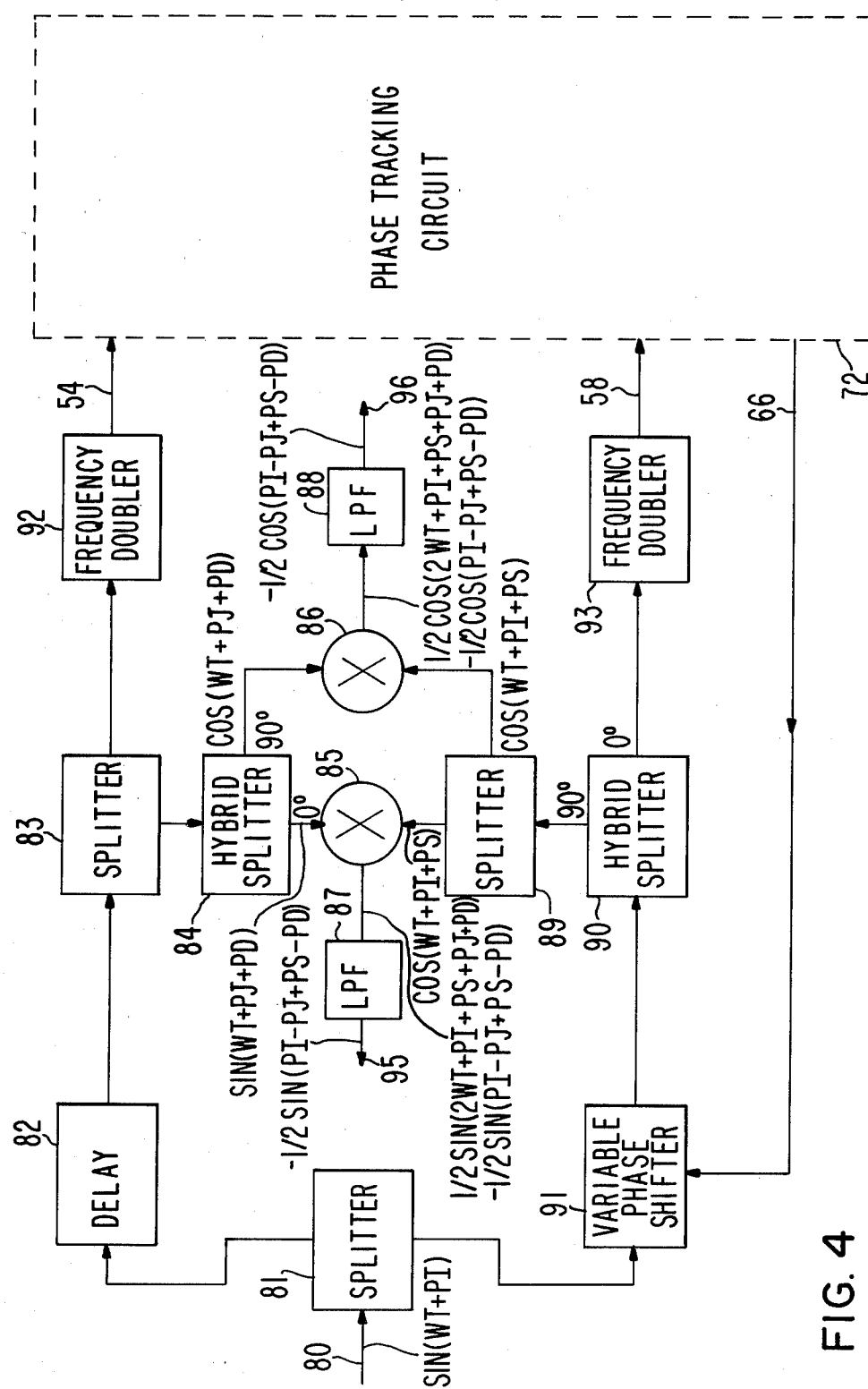
FIG. 4 is a block diagram of a differentially coherent signal detector of the present invention for quadraphase shift keyed signals.

This technique, which compensates for phase shifts introduced by the delay in a differentially coherent signal detector, can be extended for use with quadraphase shift keyed (QSK) modulation. Such an embodiment is shown in FIG. 4. In quadraphase modulation, the phase differential of the new bit pair is either X+0°, X+180°, X+90°, or X−90° relative to the phase differential X of the signal associated with the previous bit pair. The modulated signal is fed to splitter 81 at 80. One portion of the signal is fed to delay 82. The output of delay 82 is fed to splitter 83. One portion of the signal is fed to a frequency doubler 92. The output of doubler 92 is fed by a connection 54 to phase tracking circuit 72. The other portion of the signal from splitter 83 is fed to a hybrid splitter 84. The inphase portion, sin(WT+PJ+PD), of this splitter is fed to a mixer 85 while the quadrature portion, cos (WT+PJ+PD), is fed to a mixer 86.

The other portion of the signal from splitter 81 is fed to a variable phase shifter 91. The output of this shifter is fed to a hybrid splitter 90. The inphase portion is fed to a frequency doubler 93 which is in turn connected to phase tracking circuit 72 via connection 58. The quadrature portion from splitter 90 is fed to a splitter 89. Portions of the signal from splitter 89, cos (WT+PI+PS), are fed to mixers 85 and 86. The output of mixer 85 is $\frac{1}{2}$ sin (2WT+PI+PS+PJ+PD)−$\frac{1}{2}$ sin (PI−PJ+PS−PD). This is low passed by filter 87 to produce −$\frac{1}{2}$ sin (PI−PJ+PS+PD) at 95. The output of mixer 86 is $\frac{1}{2}$ cos (2WT+PI+PS+PJ+PD)−$\frac{1}{2}$ cos (PI−PJ+PS−PD). This is low passed by filter 88 to produce −$\frac{1}{2}$ cos (PI−PJ+PS−PD) at 96.

Hybrid splitter 84, splitter 89, mixers 85 and 86, and low pass filters 87 and 88 form a quadrature detector.

Suppose PS−PD equals 0°. Then if PI−PJ is equal to 0°, 180°, 90°, or −90°, respectively, the output at 95 will be 0, 0, −$\frac{1}{2}$, $\frac{1}{2}$, respectively, while the output at 96 will be −$\frac{1}{2}$, $\frac{1}{2}$, 0, 0, respectively. Thus, the outputs of 95 and 96 can be used in conjunction to distinguish the four phases used in quadrature shift keying.

The signals fed to phase tracking circuit 72 in FIG. 4 by connections 54 and 58 are twice the frequency of those shown in FIG. 3. The hardware of the phase tracking circuit 72 is not changed; however, the frequency doublers 92 and 93 affect the output of the tracking circuit on connection 66.

Because of the frequency doublers 92 and 93, the output of mixer 61 is $\frac{1}{2}$ sin (4WT+2PJ+2PD+2PI+2PS) −$\frac{1}{2}$ sin (2PI−2PJ+2PS−2PD). The output of mixer 62 is $\frac{1}{2}$ cos (2PI−2PJ+2PS−2PD)−$\frac{1}{2}$ cos (4WT+2PJ+2PD+2PI+2PS). The output of multiplier 65 is $\frac{1}{8}$ sin (4(PI−PJ)+4(PS−PD). PI−PJ is either 0°, 180°, −90° or 90°. Four times this is 0°, 720°, −360°, or 360°. These are all multiples of 360°, so the output of multiplier 65 simplifies to $\frac{1}{8}$ sin (4(PS−PD)). This signal is independent of the quadraphase shift keyed modulation, but dependent on the difference between the delay induced phase variation and the shifter induced phase variation.

The loop formed by phase tracking circuit 72 and variable phase shifter 91 is stable when PS−PD is equal to 90°, −90°, 180°, or −180°. The loop is unstable if PS−PD is equal to 45°, −45°, 135°, or −135°. In the case of instability, the loop will settle at one of the stable values. This loop will thus keep the phase of the delayed and shifted portions of the signals in the differentially coherent detector at either 90°, −90°, 180°, or −180°. This introduces angular offsets into the output at 95 and 96, leading to "1" or "0" ambiguities whch can be resolved by the coding.

The technique of the present invention can be extended to a phase shift keyed signal having an arbitrary even order by replacing the detector portion of the circuit (items 84 through 89 in the case of quadraphase shift keying) with a detector capable of detecting that particular order of phase shift keying, and by replacing frequency doublers 92 and 93 with frequency mulitpliers of the appropriate magnitude. For example, for hex phase shift keying, frequency triplers are used at 92 and 93; for octal phase shift keying, frequency quadruplers are used at 92 and 93; etc. In general, for Nth-order phase shift keying, items 92 and 93 must multiply the frequency by a factor of N/2.

The above description is included to illustrate the operation of the preferred embodiments and does not limit the scope of the invention. The scope of the invention is to be limited only by the following claims. From the above discussion many variations will be apparent to one skilled in the art that would yet be encompassed by the spirit and scope of the invention.

What is claimed is:

1. A coherent PSK signal demodulator having automatic compensation of phase variations in its delay element comprising:
   means for splitting the signal to be demodulated into two paths:
   a delay element connected to said first path but not to said second path;
   a variable phase shifting device connected to said second path but not to said first path; and a phase tracking circuit having a first input responsive to an output of said delay element and having a second input responsive to an output of said variable phase shifting device, said phase tracking circuit further having an output for controlling the variable phase shifting device to maintain constant the phase differential between the phase variation introduced by the delay element and the phase variation introduced by the variable phase shifting device.

2. The apparatus of claim 1 further comprising the additional elements of a mixer connected between the delay element and the shifting device, and a low pass filter connected to said mixer; wherein the demodulated signal emerges at the output of said filter.

3. A demodulator as recited in claim 1 wherein said phase differential is a multiple of 180 degrees.

4. A demodulator as recited in claim 1 wherein said phase differential is an odd multiple of 90 degrees.

5. A method for automatically compensating for phase variations in the delay element of a differentially coherent PSK signal demodulator, consisting essentially of the steps of:
splitting the signal to be demodulated into first and second portions;
delaying the first portion but not the second portion of the signal; and
automatically adjusting the phase of the second portion but not the first portion to maintain a fixed component of phase differential between the delayed first portion and the adjusted second portion.

6. A method for automatically compensating for phase variations in the delay element of a coherent PSK signal demodulator, comprising the steps of:
splitting the signal to be demodulated into a first and a second portion;
delaying the first portion but not the second portion of the signal;
shifting in a variable manner the phase of the second portion but not the first portion;
obtaining the PSK-modulation-independent phase difference between the delayed first portion and shifted second portion; and
maintaining said phase difference constant by using said obtained phase difference to control said shifting via a feedback loop.

7. A differential phase correction loop that is non-responsive to phase shift modulation, comprising:
a first signal source producing a first signal of the form sin (WT+PJ+PD) where W is the frequency, T is the time, PJ is a modulation phase shift, and PD is a phase variation introduced by a delay element;
a variable phase shifter having a first input, a control input, and an output signal of the form sin (WT+PI+PS) where PI is a modulation phase shift and PS is a phase shift introduced by the shifter; and
a phase tracking circuit having a first input connected to the first signal source, a second input connected to the output signal of the variable phase shifter, and an output connected to the control input of the variable phase shifter;
wherein the phase tracking circuit produces a signal which isolates the difference between PS and PD, is independent of PI and PJ, and controls PS via the variable phase shifter so as to maintain a fixed phase differential between PS and PD.

8. A phase shift keyed signal demodulator comprising:
a first splitter having as an input the signals to be demodulated;
a delay means having an input connected to a first output of the first splitter;
a second splitter having an input connected to an output of the delay means;
a variable phase shifter having a first input connected to a second output of the first splitter;
a third splitter having an input connected to an output of the variable phase shifter;
a first mixer having a first input connected to a first output of the second splitter and having a second input connected to a quadrature output of the third splitter;
a first low pass filter having an input connected to an output of the first mixer and having as an output the demodulated signals;
a fourth splitter having an input connected to a second output of the second splitter;
a fifth splitter having an input connected to an inphase output of the third splitter;
a second mixer having a first input connected to a first output of the fourth splitter and having a second input connected to a quadrature output of the fifth splitter;
a third mixer having a first input connected to a second output of the fourth splitter and having a second input connected to an inphase output of the fifth splitter;
a second low pass filter having an input connected to an output of the second mixer;
a third low pass filter having an input connected to an output of the third mixer;
a multiplier having a first input connected to an output of the second low pass filter and having a second input connected to an output of the third low pass filter; and
a conditioning amplifier having an input connected to an output of the multiplier and having an output connected to a second input of the variable phase shifter.

* * * * *